United States Patent [19]
Rapp

[11] Patent Number: 5,096,728
[45] Date of Patent: Mar. 17, 1992

[54] EGG PASTEURIZATION UTILIZING AN ORGANOSULFUR COMPOUND

[75] Inventor: Harold Rapp, Denville, N.J.

[73] Assignee: Nabisco Brands, Inc., Parsippany, N.J.

[21] Appl. No.: 686,911

[22] Filed: Apr. 15, 1991

[51] Int. Cl.⁵ ............................................. A23B 5/005
[52] U.S. Cl. .................... 426/330.1; 426/535; 426/614
[58] Field of Search .............. 426/330.1, 532, 535, 426/298, 299, 300, 541, 637, 614

[56] References Cited

U.S. PATENT DOCUMENTS

| | | | |
|---|---|---|---|
| 3,251,697 | 5/1966 | Lineweaver et al. | 99/161 |
| 3,840,683 | 10/1974 | Strong et al. | 426/177 |
| 3,911,144 | 10/1975 | Strong et al. | 426/588 |
| 3,928,632 | 12/1975 | Glaser et al. | 426/72 |
| 4,808,425 | 2/1989 | Swartzel et al. | 426/399 |
| 4,937,085 | 6/1990 | Cherry | 426/537 |
| 4,957,759 | 9/1990 | Swartzel et al. | 426/399 |
| 4,971,827 | 11/1990 | Huang | 426/614 |

FOREIGN PATENT DOCUMENTS

| | | | |
|---|---|---|---|
| 54-25102 | 8/1979 | Japan | 426/298 |
| 59-135858 | 1/1983 | Japan | 426/298 |
| 551827 | 3/1943 | United Kingdom | 426/330.1 |

OTHER PUBLICATIONS

CA108(23)202447k.

Primary Examiner—Carolyn Paden

[57] ABSTRACT

The addition of a coagulation suppressing organosulfur compound to egg prior to pasteurization permits the use of higher temperatures without denaturing the protein. In one embodiment the addition of L-cysteine to a low-cholesterol egg product comprised principally of egg white enables pasteurization at temperatures 5° F. higher than without it.

20 Claims, No Drawings

EGG PASTEURIZATION UTILIZING AN ORGANOSULFUR COMPOUND

BACKGROUND OF THE INVENTION

The invention relates to eggs and particularly, to the discovery of an improved composition and process which permit higher temperature processing with minimal denaturation. This enables both the production of a pasteurized egg product of improved functionality and a packaged egg product having improved stability during refrigerated storage.

Pasteurization has been employed to aid in the preservation of many food products, including eggs. Eggs are particularly susceptible to degradation during heating due to the nature of their protein content. Most commercial processes are employed primarily to reduce Salmonella to safe levels while bringing spoilage-promoting organisms to levels which typically permit one to two weeks stability at refrigerator temperatures (e.g., 32° to 40° F.). Until recently, aseptically-packaged, room-temperature stable eggs or refrigerator-stable eggs were not available on a commercial scale.

In an early advance in egg pasteurization, Lineweaver and Cunningham disclosed in U.S. Pat. No. 3,251,697 that the addition of certain polyvalent metal salts enabled increasing the pasteurization temperature several degrees while not adversely affecting the physical properties of the egg.

This process was confirmed as useful by Strong and Redfern in U.S. Pat. Nos. 3,840,683 and 3,911,144 wherein they disclosed a substantially cholesterol and egg yolk free liquid egg product which had good freeze-thaw stability. These technologies permitted the marketing and wide availability of a health-oriented product highly desired by many egg lovers. When frozen, the products would last for extended times. It would be desirable, however, to improve the stability of such products against spoilage once thawed, or if maintained in a refrigerated condition without freezing.

More recently, efforts have been made to produce products which remain stable for extended periods of refrigerated or even room-temperature storage. For example, in U.S. Pat. No. 3,928,632, Glaser and Ingerson disclosed an aseptically-packaged, low-cholesterol egg product having an additive emulsion which is separately sterilized and homogenized prior to mixing with an egg component. No details of egg pasteurization are provided, but a lactylate salt is an essential ingredient. It would be desirable to increase the acceptable pasteurization temperatures to achieve longer shelf lives with minimal equipment fouling.

Swartzel et al, in U.S. Pat. Nos. 4,808,425 and 4,957,759 disclose the ability to obtain a shelf-stable whole egg product by high-temperature, short-time ultrapasteurization of liquid whole egg combined with aseptic packaging. In European Patent Application 344,123 Maley et al point out that whole eggs can withstand temperatures about 20° F. higher than egg white. Denaturation is preferably kept as low as possible. Similarly, in U.S. Pat. No. 4,971,827, Huang discloses that high temperatures can be employed when turbulent flow is achieved during pasteurization.

It would be advantageous to have an additive, formulation or procedure for assuring low degrees of denaturation with adequate heat treatment for preservation.

SUMMARY OF THE INVENTION

It is an object of the invention to provide a process for pasteurizing liquid egg products at temperatures which maximize the reduction of viable organisms while minimizing denaturation of the egg.

It is another object of the invention to provide a refrigerator-stable packaged egg product having a very low level of denatured protein.

It is another object of the invention to improve the processing of liquid egg products which are essentially free of fat and cholesterol.

It is yet another object of the invention to improve current egg processing to provide an improved packaged egg product.

These and other objects are accomplished according to the invention which provides an improved process for pasteurizing liquid egg formulations and improved liquid egg formulations, both pasteurized and unpasteurized.

According to the process of the invention, an improvement is provided in the preparation of a pasteurized liquid egg product by heating the liquid egg for a time and at a temperature effective to reduce the population of viable microorganisms, the improvement comprising: prior to heating, admixing coagulation suppressing organosulfur compound with the liquid egg in an amount effective to reduce coagulation under the conditions of heating. The liquid egg, both prior to and after pasteurization, are also new and provide improvements over the prior art.

DETAILED DESCRIPTION

The present invention will be described in terms of the pasteurization of a liquid, low-cholesterol egg formulation comprised principally of egg white and preferably contains little or no egg yolk. Representative compositions of this type are exemplified in U.S. Pat. Nos. 3,840,683 and 3,911,144 to Strong and Redfern, U.S. Pat. No. 3,928,632 to Glaser and Ingerson, U.S. Pat. No. 4,971,027 to Huang, and European Patent Application 344,123 to Maley et al. The invention is not limited to compositions of this type and can be used with whole egg product formulations as disclosed by Swartzel et al in U.S. Pat. Nos. 4,808,425 and 4,957,759. Each of the above patent disclosures is incorporated by reference in its entirety.

Typically, low cholesterol liquid egg products have as a major component liquid egg whites with minor amounts of a variety of other ingredients, including water, vegetable oil, vitamins, minerals, emulsifiers, stabilizers, metal salts as pasteurization aids, and coloring. An agent such as a xanthan gum can also be utilized to impart freeze-thaw stability to the liquid egg product.

It has now been discovered that, in addition to the metal salts known to the art, there are organosulfur compounds which suppress the coagulation of egg protein. Effective coagulation suppressing organosulfur compounds are safe for food use and cause little effect on the egg flavor. Preferred compounds include L-cysteine and its precursors such as glutathione. The L-cysteine is preferably added as the salt form, e.g. cysteine hydrochloride. A carrier such as lactose, dextrose, maltodextrin or other particulate carbohydrate can be employed as desired.

The organosulfur compounds are added to the egg in an amount effective to suppress coagulation, thereby permitting higher pasteurization temperatures and/or times. Typically, the organosulfur compounds will be used at a level of from 0.005 to 0.5 percent of the weight of the egg. Preferred amounts will be in the range of from 0.01 to 0.1 percent.

In addition to the coagulation suppressing organosulfur compounds of the invention, it is preferred to employ polyvalent metal compounds with the same effect to achieve the maximum suppression of coagulation to permit the greatest degree of kill of spoilage-causing and pathogenic organisms. The disclosure of U.S. Pat. No. 3,251,697 to Lineweaver and Cunningham is incorporated herein by reference. Preferably, the coagulation suppressing polyvalent metal compound is a salt of a metal selected from the group consisting of aluminum, iron, copper, nickel, manganese, cobalt, zinc, and cadmium. Most desirably, the metal comprises aluminum and is employed in an amount of from 0.0003 to 0.003 molar.

The egg white is responsible to a significant degree for providing the desirable organoleptic and functional characteristics of the liquid egg product. It is preferred that the principal protein source in the egg composition consist essentially of egg white. Other protein sources such as soya protein, whey, and casein derivatives, when present in the liquid egg product, seem to impart, in certain instances, an undesirable flavor and deleteriously affect the functional characteristics of the product. They may, however, be employed in products and amounts where their effect is not significantly discernible or otherwise detrimental.

The amount of egg white present in the liquid egg product itself may be from about 24 to about 99 percent by weight. Preferably, however, the amount of egg white present is from about 40 to 99 percent and most preferably the egg white is present at a level of about 95 to 99 percent by weight. Prior to heating, the egg desirably has a pH of less than 9.0, preferably above 6.5, typically, in the range of 7.5 to 8.5.

The water in the low cholesterol liquid egg product is used primarily to solubilize water soluble ingredients which are then blended into the egg product. In addition, the water imparts some degree of increased flowability to the product. The water is typically present in the low cholesterol egg product in an amount of 0 to 5 weight percent, preferably about 0.5 weight percent.

The vegetable oil used may be any edible vegetable oil such as corn, cottonseed, soybean, safflower, sunflower, peanut, rape seed, olive, and sesame oils, and the mixtures thereof, with corn oil being preferred. The amount of vegetable oil present in the liquid egg product may vary widely. However, at high oil levels, the liquid egg product becomes soft and mushy when scrambled. Another reason for keeping oil content low is that the presence of oil increases the calorie content of the low cholesterol liquid egg product. In place of vegetable oil, a fully or partially-digestible fat mimetic such as sucrose polyester or the like can be employed. Small amounts of oil also seem to impart certain subtle organoleptic characteristics of real eggs (e.g., mouth feel and texture) to the egg product. It is therefore, preferred that the liquid egg product contain from about 0.25 to 13 percent by weight oil which is similar to the percentage of fat naturally present in whole eggs.

If desired, the composition can also include yolk. To achieve a low-cholesterol product, however, the yolk can be processed to remove a portion, e.g. from 10 to 90 percent, of the natural fat and/or cholesterol content. This can be accomplished by any of the processes known to the art, for example, those of Fioriti et al in U.S. Pat. No. 4,103,040 and of Bracco et al in U.S. Pat. No. 4,333,959, the disclosures of which are incorporated herein by reference.

For a liquid egg product to be acceptable to the consumer, it should be colored so that it has the characteristic color of whole eggs. It is preferred that the colorant comprises a mixture of beta-carotene and approved F D & C food colorants (e.g., F D & C yellow No. 5 and No. 6) in suitable proportions and amounts to impart to the egg compositions the characteristic color of whole eggs. Beta-carotene is oil soluble and water insoluble, while F D & C yellow No. 5 and No. 6 are water soluble and oil insoluble. When an oil soluble colorant or other ingredient is used in the product, it is recommended that it first be dissolved in a small amount of vegetable oil so that it can be dispersed substantially evenly throughout the liquid egg product.

The xanthan gum, which can be employed in the liquid egg product to impart freeze-thaw stability, is a complex polysaccharide derived from the microorganism Xanthamonas Campestris. Preferably, xanthan gum is used in conjunction with a plurality of gums. It has been discovered that a blend of xanthan gum, guar gum, and carrageenan is particularly effective in imparting freeze-thaw stability, syneresis resistance, satisfactory viscosity, and suitable texture. The gum blend is present in the low cholesterol liquid egg product in amounts of 0.05 to 0.5 weight percent, preferably 0.21 weight percent. The constituents of the gum blend are present in the blend in amounts of 40 to 90 weight percent, preferably 55 weight percent xanthan gum, 10 to 50 weight percent, preferably 35 weight percent guar gum, and 0 to 25 weight percent, preferably 10 weight percent carrageenan. Although xanthan gum is non-gelling, the additional use of guar gum permits the low cholesterol egg product to form an interrupted gel which is less stringy or gummy than non-gelling compositions and achieves improved freeze-thaw stability and syneresis resistance compared to the individual gums.

The low cholesterol liquid egg ingredients can be blended by a variety of methods. A major objective is to minimize foaming, which egg whites easily induce when subjected to agitation. Preferably, foaming is minimized by blending all of the other ingredients into the egg whites with a Tri-Blender TM mixer manufactured by Ladish Co., Inc., Tri-Clover Division, Kenosha, Wis. The beta-carotene, oil soluble vitamins, other oil soluble components, and the gums are all pre-blended and introduced through a port near the throat of the Tri-Blender TM mixer. Water soluble ingredients (including the vegetable sauce) are also pre-blended with water and added to the egg whites. Dry ingredients are added through the funnel of the Tri-Blender TM either separately or in pre-blended form.

When all the ingredients are added to the egg whites, the mixture is heat pasteurized, cooled to a temperature suitable for preservation, and packaged. Optionally, the mixture may be homogenized after heating to the pasteurizing temperature. Also, at this point dilute hydrogen peroxide can be added to enhance the effect of the processing.

Pasteurization entails heating the liquid egg to a temperature and for a time effective to reduce the number of microbial organisms to effectively remove the threat of pathogenic organisms such as Salmonella and to extend the refrigerated storage life of the product. The heat treatment necessary to kill the microorganisms is, like that which causes coagulation of protein, a function of both time and temperature. Longer times require lower temperatures and higher temperatures permit shorter processing times.

The present invention enables achieving a better degree of microbial reduction with less coagulation of the liquid egg. The invention enables this by making it possible to increase the time and/or the temperature used during heating. The heat treatment desirably causes "nine log cycle" (9D) reduction in the count of viable Salmonella organisms, i.e., the number is reduced 99.9999999%. And, the count of spoilage causing microbes is reduced sufficiently to provide at least two weeks storage at refrigerator temperature, i.e. 4° C. Preferred degrees of heat treatment will enable refrigerator storage without spoilage for from 1 to 12 months.

The desired degree of storage stability must be achieved without adversely affecting the liquid character of the egg. One measure of the degree of coagulation is the loss of soluble protein which can be measured by standard techniques (see for example: Hamid-Samini et al, J. Food Sci. 49:132 (1984)). It is desired to maintain the loss of soluble protein to less than 20 percent, preferably less than 10 percent, and most desirably less than 5 percent.

The effect of the coagulation suppressing organosulfur compounds can be quantified by subjecting the egg sample, prior to heating, to Differential Scanning Calorimetry (DSC). This technique is explained, for example, by Donovan et al, in *A Differential Scanning Calorimetric study of the Stability of Egg White to Heat Denaturatio*, J. Sci. Fd Agric., vol 26, pp. 73-75 (1973). Subjecting an egg sample to DSC results in a plot on which temperature ranges of protein denaturation show up as peaks. The plot, with temperature on the abscissa, shows that the compounds of the invention shift the peaks to the right. According to more preferred aspects of the invention, it is desired to shift the principal peak by at least 2° C. to the right (i.e., higher) and most desirably from 5° to 10° C.

To heat process a low-cholesterol egg product of the type described above, the liquid egg is pumped through a suitable heat exchanger such as a Cherry-Burrell plate or Spiratherm TM heat exchanger to bring the temperature rapidly up to the desired level, e.g. at least 60° C., and preferably within the range of from 62° to 67° C., at which it is held for the time effective at that temperature, e.g. 10 minutes or less, e.g. from 1 to 8, desirably 5 to 7 minutes. Rapid cooling then preserves the liquid character of the egg, and minimizes soluble protein loss and viscosity increase.

The processed liquid egg is then packaged by feeding it into a heat-sealable package, typically a polymer-coated fiberboard gusseted-top container. Following filling, the container is sealed. Desirably, filling and sealing will be under aseptic conditions. The filled and sealed containers are then refrigerated, preferably frozen. Products prepared and packaged in this manner will preferably be stable against spoilage at refrigerator temperature (4° C.) for at least 2 weeks, preferably at least 30 days, typically from 60 to 180 days.

The following examples are presented to further illustrate and explain the invention and are not to be taken as limiting in any regard. Unless otherwise indicated, all parts and percentages are based on the weight of the composition at the indicated point in the process. In each of the examples, the L-cysteine was added as a commercial preparation containing L-cysteine hydrochloride and lactose as a carrier.

EXAMPLE 1

A series of liquid egg compositions was prepared and the heat treated as is and with the aid of an additive according to the invention to determine the effect of the additives on visual appearance. The liquid egg compositions contained pasteurized, defrosted egg white adjusted to a pH of 7.5 to 8.5 with lactic acid. Test tubes containing 5 ml. egg whites were immersed in a heated water bath for 7 minutes, then immersed in ice water for quick cooling. Visual observations are given in the following chart.

| Temperature (°F.) | Cysteine Preparation (%) | | |
|---|---|---|---|
| | 0 | .0625 | .09375 |
| 137 | Clear/fluid | Clear/fluid | Clear/fluid |
| 141 | Cloudy/thick | Clear/fluid | Clear/fluid |
| 143 | Opaque/curdled | Cloudy/fluid | Cloudy/fluid |
| 145 | Opaque/curdled | Cloudy/thick | Cloudy/fluid |

EXAMPLE 2

A commercial formulation of Egg Beaters ® low-cholesterol egg product prepared essentially in accordance with U.S. Pat. No. 3,911,144 (except that the formulation contained 99% egg white and no milk solids) was heated with and without a coagulation suppressing organosulfur compound to determine the effect of the compound on soluble protein loss. Losses of soluble protein due to heating can result in heat exchanger fouling and undesirable changes in egg product functionality. The following chart shows that, in most cases addition of cysteine resulted in lower levels of soluble protein loss in heated Egg Beaters ® samples.

| | Percent Soluble Protein Change | |
|---|---|---|
| Process | 0% cysteine | 0.0625% cysteine preparation |
| Control, no heat | 0 | 0 |
| Heated, 137° F. | +2.8 | +4.8 |
| Heated, 141° F. | +2.7 | −8.1 |
| Heated, 145° F. | −28.7 | −1.4 |

EXAMPLE 3

Two samples of liquid egg at pH of about 8.5, one with L-cysteine hydrochloride preparation (0.09375%) and one without, were subjected to Differential Scanning calorimetry. The resulting charts showed a shift of about 9° C. in the peaks corresponding to coagulation temperature, indicating a significant increase in coagulation temperature.

EXAMPLE 4

When egg white coagulates, its viscosity increases. The viscosity of two egg white samples was tested on a highly sensitive Rheometrics Viscosimeter. In this instrument the temperature of the sample is raised while the viscosity of the sample is being constantly recorded. Egg white without L-cysteine showed a peak in viscosity occurring at 65° C. When 0.09375 percent L-cysteine preparation was added, the viscosity peak occurred at 67° C. This result provides additional evidence that the heat coagulation of egg white is meliorated by the addition of cysteine.

EXAMPLE 5

Several samples of egg formulation of the type described in EXAMPLE 2 were heated in a Cherry Burrell plate-type heat exchanger, held at that temperature for six minutes, and cooled. To some, 0.09375% of the cysteine preparation was added, to others it was not. The viscosity was measured because this is related to protein denaturation. The results are shown in the following table.

| Cysteine | Average Hold Tube Temperature (°F.) | Viscosity (cps) |
| --- | --- | --- |
| no | 142 | 225 |
| no | 143.5 | 412 |
| no | 145 | 505 |
| yes | 143 | 270 |
| yes | 143.5 | 295 |
| yes | 145.25 | 380 |
| yes | 147 | 455 |

The above description is for the purpose of teaching the skilled worked how to practice the invention and is not intended to detail all of the obvious modifications and variations of it which, while not specifically set forth, are included within the scope of the invention which is defined by the following claims.

What is claimed is:

1. In a process for preparing a pasteurized, packaged liquid egg product by heating the liquid egg for a time and at a temperature effective to reduce the population of viable microorganisms to cause a nine log cycle reduction in the count of viable Salmonella organisms, feeding the liquid egg into sealable packages, and sealing the packages, the improvement comprising:
   prior to heating, admixing coagulation suppressing organosulfur compound with the liquid egg in an amount effective to reduce coagulation under the conditions of heating.

2. A process according to claim 1 wherein the coagulation suppressing organosulfur compound is employed at a level of from 0.005 to 0.5 percent by weight of the egg.

3. A process according to claim 2 wherein the coagulation suppressing organosulfur compound is L-cysteine or a precursor of it and is employed at a level of from 0.01 to 0.1 percent by weight of the egg.

4. A process according to claim 1 wherein the coagulation suppressing compound is selected from the group consisting of L-cysteine and glutathione.

5. A process according to claim 4 wherein the coagulation suppressing compound comprises L-cysteine.

6. A process according to claim 4 wherein the coagulation suppressing compound comprises glutathione.

7. A process according to claim 1 wherein the pH of the liquid egg is less than 9.0 prior to heating.

8. A process according to claim 7 wherein the pH of the liquid egg is within the range of 6.5 to 8.5.

9. A process according to claim 1 wherein the egg comprises from 95 to 99% egg white.

10. A process according to claim 9 wherein the egg further comprises yolk.

11. A process according to claim 10 wherein the yolk has been treated to remove a portion of the natural fat and cholesterol content.

12. A process according to claim 1 wherein a coagulation suppressing polyvalent metal compound is added to the liquid egg prior to pasteurization.

13. A process according to claim 12 wherein the coagulation suppressing polyvalent metal compound is a salt of a metal selected from the group consisting of aluminum, iron, copper, nickel, manganese, cobalt, zinc, and cadmium.

14. A process according to claim 13 wherein the metal comprises aluminum and is employed in an amount of from 0.0003 to 0.003 molar.

15. A product prepared according to the process of claim 1.

16. A process according to claim 1 wherein the coagulation suppressing organosulfur compound is L-cysteine or a precursor of it and is employed at a level of from 0.05 to 0.5 percent by weight of the egg, and the composition further comprises a coagulation suppressing polyvalent metal salt of a metal selected from the group consisting of aluminum, iron, copper, nickel, manganese, cobalt, zinc, and cadmium, in an amount of at least 0.0003 molar.

17. A liquid egg composition comprising egg white and a coagulation suppressing organosulfur compound comprising L-cysteine or a precursor of it at a level of from 0.005 to 0.5 percent by weight of the egg, said amount effective to increase the coagulation temperature of the egg white, and a coagulation suppressing polyvalent metal salt or a metal selected from the group consisting of aluminum, iron, copper, nickel, manganese, cobalt, zinc, and cadmium, in an amount of from 0.003 to 0.003 molar.

18. A liquid egg composition according to claim 17 wherein the pH of the liquid egg is within the range of 6.5 to 8.5.

19. A packaged egg product comprising a sealed container filled with a liquid egg composition comprising L-cysteine or a precursor of it at a level of from 0.005 to 0.5 percent by weight of the egg and a coagulation suppressing polyvalent metal in an amount of from 0.0003 to 0.003 molar, said egg composition being capable of being stored at 4° C. for at least 30 days.

20. A product according to claim 19 wherein the liquid egg composition exhibits a pH of from 6.5 to 8.5.

* * * * *